United States Patent [19]

Cohen

[11] 4,348,453
[45] Sep. 7, 1982

[54] GLAZING POSSESSING SELECTIVE TRANSMISSION AND REFLECTION SPECTRA

[75] Inventor: Sabatino Cohen, Sceaux, France

[73] Assignee: Saint-Gobain Vitrage, Neuilly-sur-Seine, France

[21] Appl. No.: 248,895

[22] Filed: Mar. 30, 1981

[30] Foreign Application Priority Data

Mar. 28, 1980 [FR] France .............................. 80 06973

[51] Int. Cl.³ ..................... B32B 15/04; B32B 17/06
[52] U.S. Cl. ................................. 428/333; 428/433; 428/434; 428/469; 428/918
[58] Field of Search .............. 428/213, 215, 216, 333, 428/432, 433, 434, 469, 918

[56] References Cited

U.S. PATENT DOCUMENTS

| | | |
|---|---|---|
| 2,676,117 | 4/1954 | Colbert et al. .................... 428/432 |
| 3,347,693 | 10/1967 | Wendland .......................... 428/432 |
| 4,022,947 | 5/1977 | Grubb et al. ....................... 428/432 |
| 4,066,815 | 1/1978 | Olink et al. ........................ 428/432 |
| 4,098,956 | 1/1978 | Blickensderfer et al. .......... 428/432 |
| 4,187,336 | 2/1980 | Gordon ............................. 428/333 |

FOREIGN PATENT DOCUMENTS 1513724  1/1968  France .
2335462  7/1977  France .

OTHER PUBLICATIONS

UK Patent Application GB 2009723 A, published 6/20/79.

Primary Examiner—William J. Van Balen
Attorney, Agent, or Firm—Pennie & Edmonds

[57] ABSTRACT

Glass sheets having controlled reflection and transmission spectra in which a metallic reflective layer deposited on the surface of a glass substrate is coated with a protective layer consisting of a cadmium and tin oxide mixture wherein the atomic ratio of the cadmium/tin is between about 0.2 and about 10. Alternatively, the metallic reflective layer is deposited on an anchoring layer which is deposited directly on the surface of the glass substrate. The anchoring layer advantageously consists of a cadmium and tin oxide composition identical to that utilized to form the protective layer. According to the present invention, the transmission and reflection spectra of a glass sheet can be modified by controlling the thickness and/or composition of each layer, particularly the composition of one or more of the cadmium-tin oxide layers, to produce glass sheets which exhibit excellent transparency in the visible spectrum and high reflection in the thermal infrared spectrum, thereby reducing energy losses.

10 Claims, 10 Drawing Figures

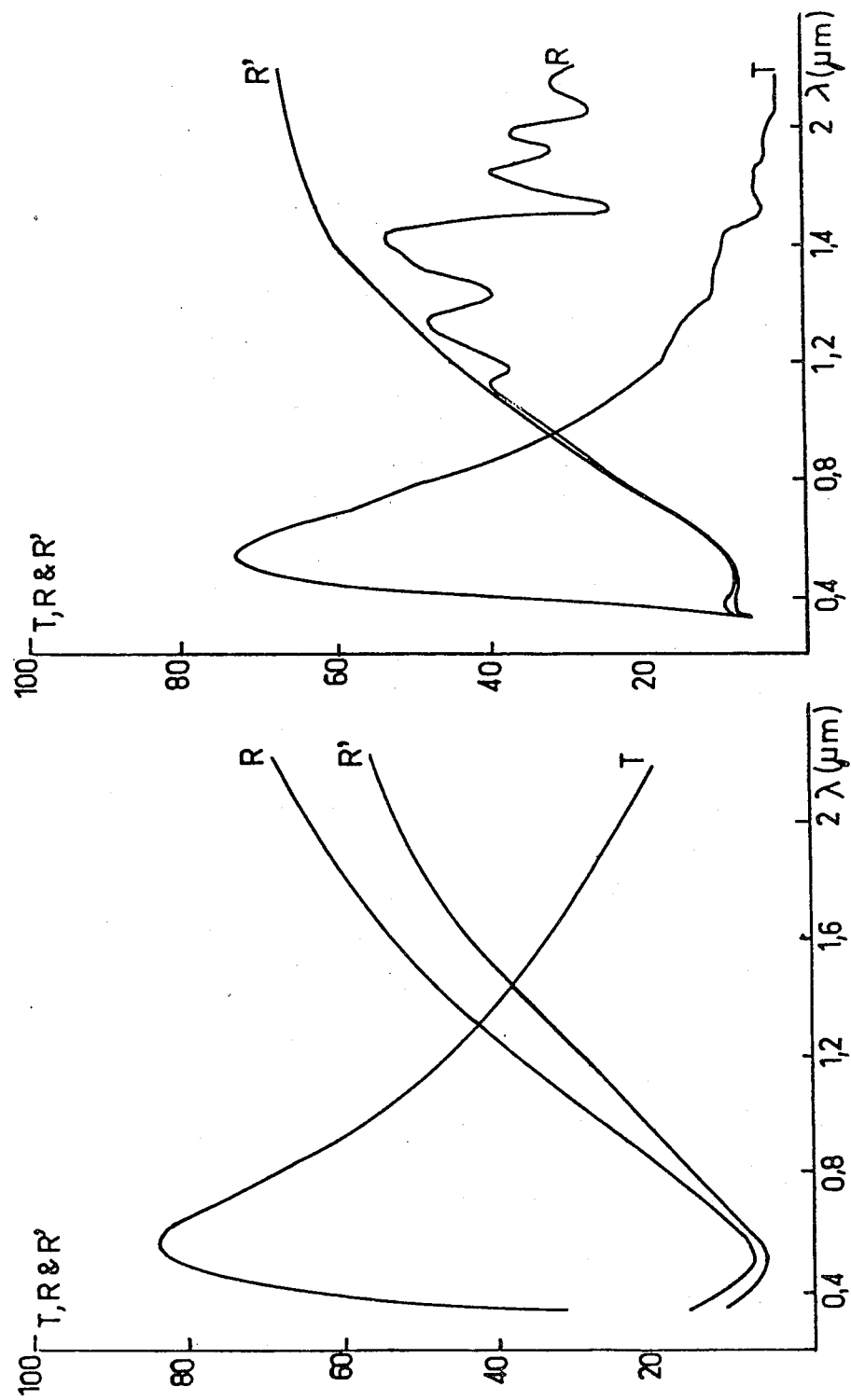

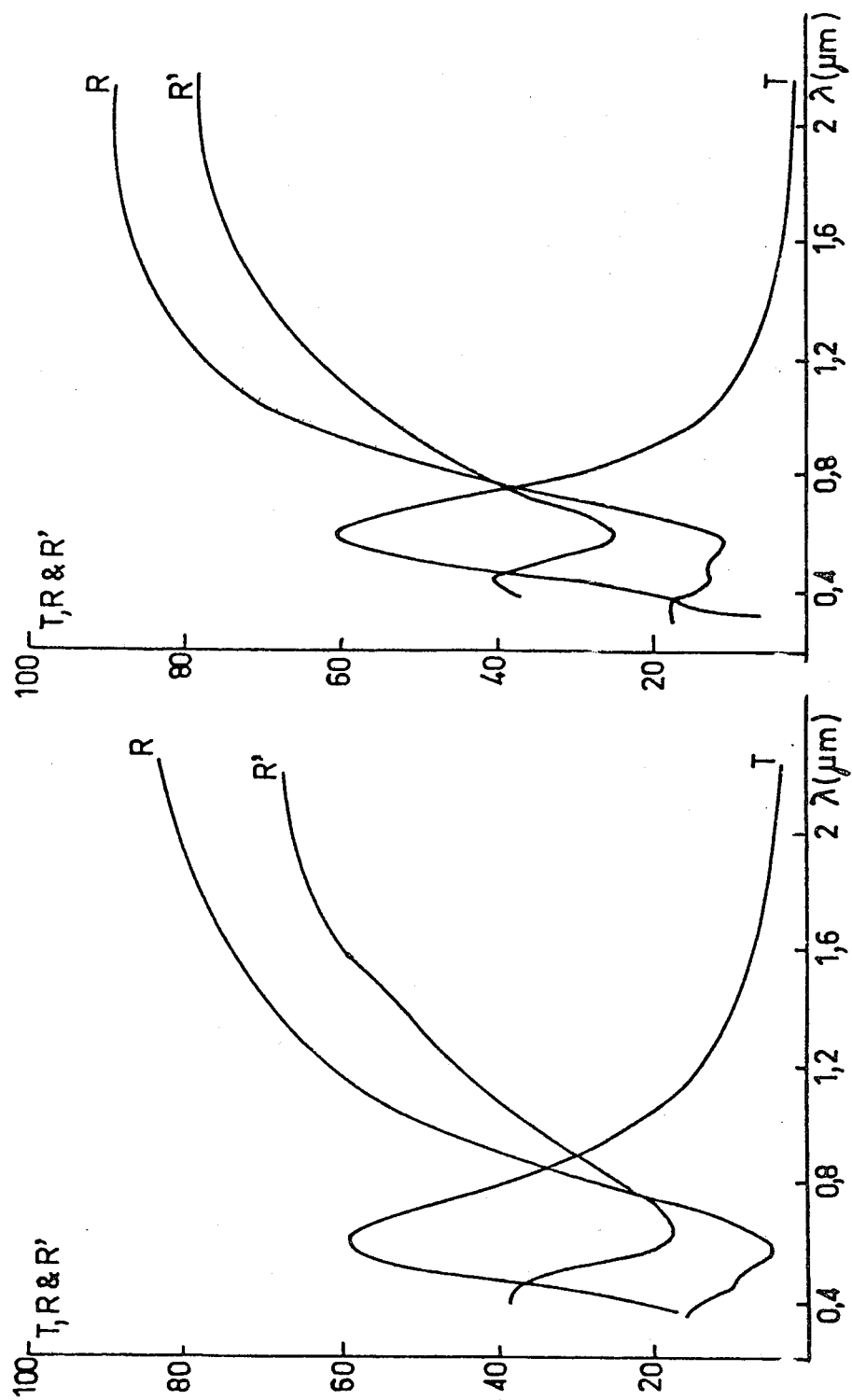

GLAZING POSSESSING SELECTIVE TRANSMISSION AND REFLECTION SPECTRA

BACKGROUND OF THE INVENTION

1. Field of the Invention

The present invention relates to semi-reflective glass sheets, having metallic coatings deposited thereon, in which the transmission and reflection spectra are modified in both the visible and infrared spectra by controlling the amount and composition of the metal oxide compounds utilized in forming the protective layer of said coating.

2. Prior Art

It is well known that semi-reflective glass sheets can be constructed utilizing various metallic compounds coatings as protective layers which are deposited onto a reflective layer. Such coatings will impart heat-protective properties to a substrate material by substantially increasing the amount of infrared radiation reflected from the coated surface while maintaining a satisfactory radiation transmission coefficient in the visible range of the solar spectrum. Glazings of this type are often used in buildings to alleviate excessive heat during the summer months.

These prior art glazings are composed of three successive layers deposited on the surface of a glass substrate. The first, or anchoring, layer is deposited directly on the surface of the glass substrate. This layer is often a dielectric material or a metallic alloy, such as one containing nickel and chrome. The second layer, which provides the reflective properties, generally consists of a precious, semiprecious, or ordinary metal such as gold, silver, or copper, respectively. Various metallic alloys can also be employed to form this layer. The third, or protective, layer generally consists of a dielectric material such as zinc sulfide. This layer not only enhances the optical qualities of the entire coating but can also protect the reflective layer from the hazards which accompany exposure to the environment. These three layers can be deposited by various processes, such as thermal evaporation under vacuum.

The present invention is directed to a glass sheet in which the transmission and reflection spectra are controlled in both the visible and infrared spectra. More particularly, the glass sheets disclosed in this invention possess excellent transparency in the visible spectrum and high reflection in the thermal infrared spectrum, thereby reducing energy losses.

SUMMARY OF THE INVENTION

Applicant has discovered that the transmission and reflection spectra of glass sheets can be controlled by depositing onto a metallic reflective layer, which is deposited on the surface of the substrate, a protective layer consisting of a tin and cadmium oxide mixture. The use of single layers of cadmium stannate ($Cd_2SnO_4$) on a glass substrate is already known, but noteworthy reflective properties of said single layers need a sharp process. However, when mixtures of tin and cadmium oxides, are employed as protective layers and the cadmium/tin atomic ratio is properly controlled, superior and unexpected results are produced as compared to prior art, especially the layers of cadmium stannate in which the cadmium/tin atomic ratio is limited to 2:1. By using the mixtures disclosed in the present invention, the atomic ratio of the cadmium/tin in the protective layer can vary from about 0.2 to about 10. The lower ratios hinder reflection in the infrared spectrum while the upper values provide poor chemical resistance. In an alternate construction, the reflective layer is deposited on an anchoring layer which has been previously deposited directly on the surface of the glass substrate. This anchoring layer is advantageously a mixture of a cadmium and tin oxide identical to that utilized in forming the protective layer.

BRIEF DESCRIPTION OF THE DRAWINGS

FIGS. 1–10 represent the percentage of transmission on the coated side (T), the percentage of reflection on the coated side (R) and the percentage of reflection on the uncoated side (R') as a function of wavelength ($\lambda$) of the glass sheets described in Examples 1–10, respectively.

DETAILED DESCRIPTION OF THE INVENTION

Figure 2:
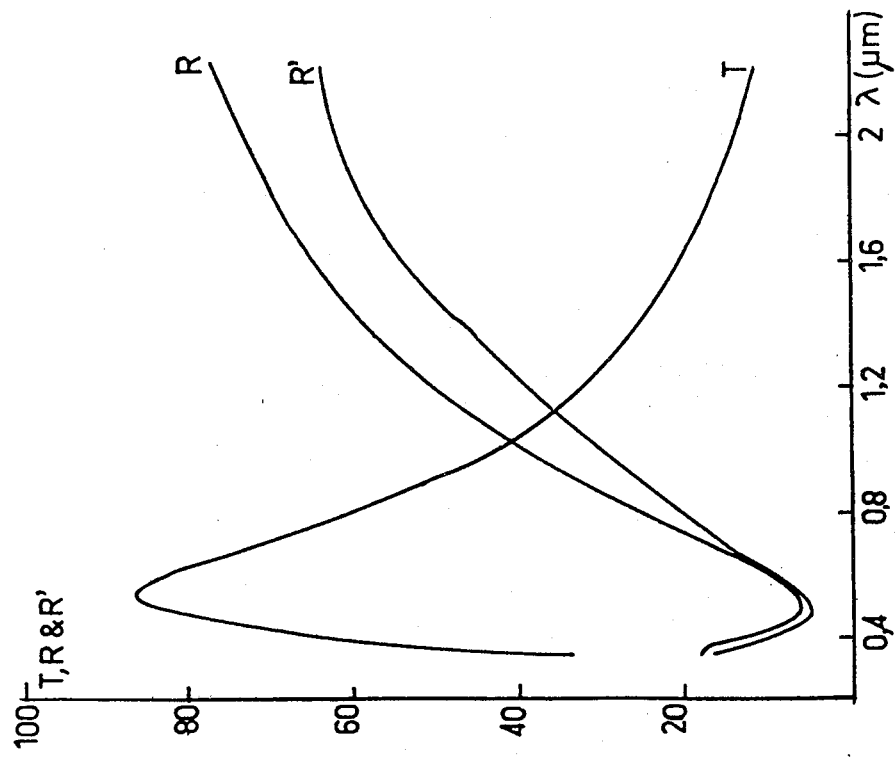

Applicant has discovered that the reflection and transmission spectra of semi-reflective glass sheets can be controlled by coating the reflective layer with a protective layer consisting of a cadmium and tin oxide mixture. Specifically, the reflection and transmission spectra are modified by controlling the cadmium/tin atomic ratio between about 0.2 and about 10. When this ratio approaches 0.2, reflection in the infrared spectrum is decreased whereas when the ratio approaches 10, the chemical resistance of the protective layer is lessened.

Glass sheets according to the present invention enable a significant reduction in the thickness of the reflective layer. This represents a considerable economic saving especially when this layer consists of gold or silver. In fact, without decreasing the reflection of these metals, the glass sheets disclosed herein permit the thickness of the reflective layer to be less than 100 angstroms which represents a significant decrease from the thicknesses disclosed in the prior art. The thickness of the protective layer can equal several hundred angstroms but is usually less than about 600 angstroms.

The reflective layer may be deposited either directly onto the surface of the glass substrate or, alternatively, onto an anchoring layer. Applicant has discovered that if an anchoring layer is utilized such layer should consist of a cadmium and tin oxide mixture identical to the composition of the protective layer. In this manner, both the anchoring and protective layers may be deposited in the same enclosure using the same process and equipment.

The anchoring layer is usually very thin, about 10 angstroms. When constructing glasses which incorporate heating elements, however, the thickness is several hundred angstroms. The anchoring layer could be omitted if a high transparency is not desired.

Each successive layer may be deposited by any known process, such as thermal evaporation, cathode sputtering which continuous diode, radio-frequency, or with the use of a magnetron. During the deposition process, the substrate and the metallic source can be maintained in a stationary position or they may be allowed to move in relation to one another.

In order to insure reproducibility of the glass sheets of the present invention, the cadmium and tin oxide mixture is deposited from a target in which the atomic ratio of cadmium/tin is from one to three.

The following non-restrictive examples illustrate the manufacture of the glazings of the present invention.

Each example refers to an accompanying figure in which the percentage of transmission (T), the percentage of reflection on the coated side (R), and the percentage of reflection on the uncoated side (R') are given as a function of the wavelength (λ).

EXAMPLE 1

Cathode sputtering equipment employing a gold target and a cadmium-tin alloy target having a cadmium/tin atomic ratio of two is utilized. An anchoring layer of a cadmium and tin oxide mixture is deposited on the surface of a float glass substrate which has a thickness of 44 mm. The deposition is carried out in an argon-oxygen atmosphere containing 20% oxygen by volume under a pressure of 40 millitorrs with a voltage of −930 V applied for 30 seconds. The resulting layer has a thickness of less than 10 angstroms.

A layer of gold is deposited onto the anchoring layer in an argon atmosphere under a pressure of 50 millitorrs with a voltage of −2150 V applied for 8 seconds. The resulting layer has a thickness of about 70 angstroms.

Using the same cadmium-tin alloy target used in depositing the anchoring layer, a cadmium and tin oxide layer is deposited onto the gold. The deposition takes place in an argon-oxygen atmosphere containing 20% oxygen by volume at a pressure of 40 millitorrs with a voltage of −2050 V applied for 125 seconds. The resulting layer has a thickness of about 300 angstroms.

Figure 1:
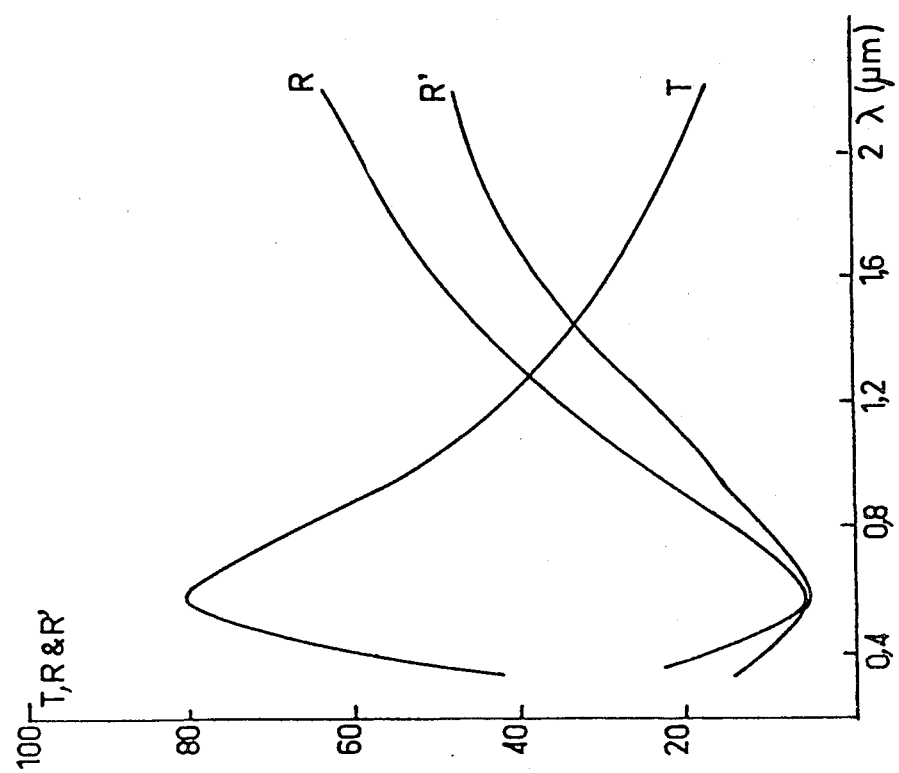

As shown in FIG. 1, the resulting glass exhibits good reflection in the infrared spectrum and a transparency exceeding 78% in the visible spectrum.

EXAMPLE 2

The gold target of the cathode sputtering device previously described in Example 1 is replaced with a silver target. The same cadmium-tin alloy target is maintained. A float glass substrate having a thickness of 4 mm is coated with three successive layers. A cadmium-tin oxide layer of about 10 angstroms is deposited in an argon-oxygen atmosphere containing 10% oxygen by volume at a pressure of 40 millitorrs with a voltage of −1020 V applied for 20 seconds.

Next, a silver layer with a thickness of about 100 angstroms is deposited onto the anchoring layer in an argon atmosphere at a pressure of 40 millitorrs with a voltage of −2380 V applied for 11 seconds.

A layer of cadmium-tin oxide with a thickness of about 200 angstroms is then deposited in an argon-oxygen atmosphere containing 10% oxygen by volume at a pressure of 40 millitorrs with a voltage of −3300 V applied for 24 seconds.

As shown in FIG. 2, the resulting glazing exhibits good reflection in the infrared range and an excellent luminous transmittance of 84%.

EXAMPLE 3

In this example, two rectangular magnetron cathodes are utilized. One has a silver target while the other target is made of a cadmium-tin alloy in which the cadmium/tin atomic ratio is three. A 4 mm thick glass substrate, traveling at 10 meters/hr, passes under the cadmium-tin alloy target in an argon-oxygen atmosphere containing 20% oxygen by volume at a pressure of 6 millitorrs with a voltage of −250 V.

After the anchoring layer has been deposited, the coated substrate, traveling at 25 meters/hr, passes under the silver target in an argon atmosphere at a pressure of 6 millitorrs with a voltage of −185 V.

Finally, the substrate, traveling at 22 meters/hr, passes under the cadmium-tin alloy target at a voltage of −285 V. The thickness of each layer is comparable to that of the preceding examples.

As shown in FIG. 3, the performance of resulting glass in the infrared region is good and its light transmission exceeds 83%.

EXAMPLE 4

Cathode sputtering equipment employing a silver target and a cadmium-tin alloy target having a cadmium/tin atomic ratio of three is utilized. A float glass substrate with two silver-lacquer, conductive strips is coated as follows. In an argon-oxygen atmosphere containing 5% oxygen by volume, a mixed cadmium-tin oxide layer with a thickness of about 500 angstroms is deposited at a pressure of 40 millitorrs with a voltage of −2320 V applied for 102 seconds.

A silver layer with a thickness of about 160 angstroms is deposited in an argon atmosphere at a pressure of 40 millitorrs with a voltage of −2380 V applied for 18 seconds.

A protective layer consisting of a mixed cadmium-tin oxide, identical in composition and thickness to the anchoring layer, is deposited.

Using a polyvinylbutyral sheet with a thickness of 0.76 mm, two identical glass sheets, one coated according to the above process, and the other noncoated, are assembled with the layers on the inside.

FIG. 4 illustrates the optical characteristics of the resulting glazing. The electrical resistance of the deposited layers is about 5 ohms/square.

EXAMPLE 5

The apparatus previously described in Example 1 is used except that the gold target is replaced with a copper target. A 4 mm thick glass substrate is coated with a layer of copper about 100 angstroms in thickness. Deposition occurs in an argon atmosphere at a pressure of 7 millitorrs while a radio-frequency of 200 watts is applied to the cathode for 10 seconds.

A cadmium-tin oxide layer of about 300 angstroms is deposited in an argon-oxygen atmosphere containing 10% oxygen by volume at a pressure of 40 millitorrs with a cathode voltage of −2200 V applied for 105 seconds.

Figure 5:
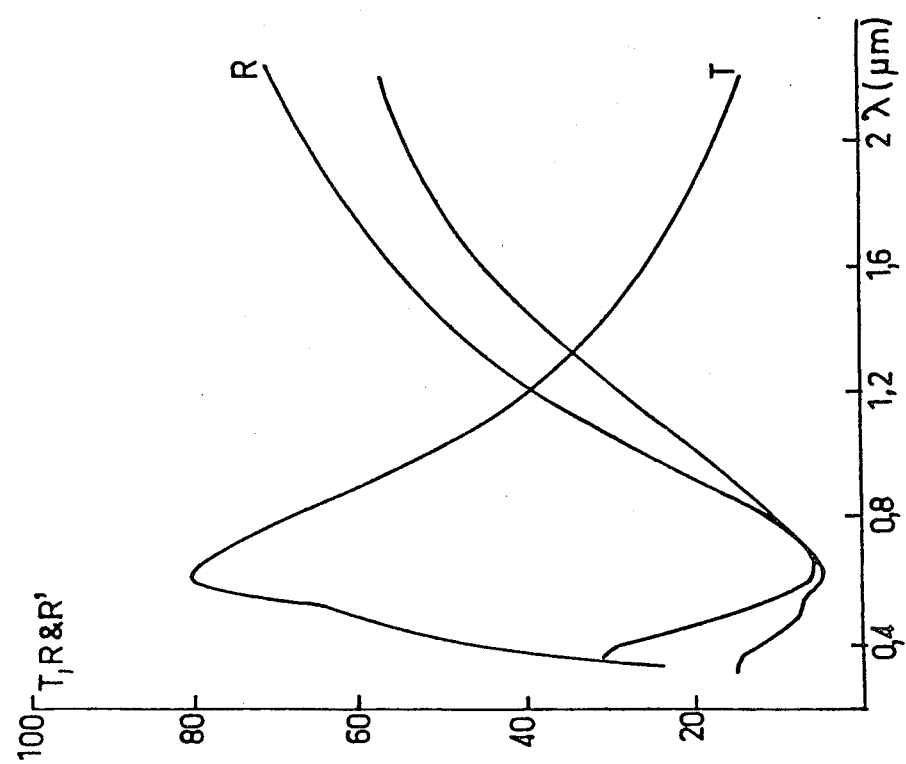

As shown in FIG. 5, the resulting glass exhibits good transparency and also provides protection from excessive heat.

EXAMPLE 6

The apparatus previously described in Example 5 is used except that the copper target is replaced with a nickel-chromium target in which the ratio of nickel/chromium by weight is four. A 4 mm thick glass substrate is coated with a layer of nickel-chromium deposited in an argon atmosphere at a pressure of 6 millitorrs while a radio-frequency of 200 watts is applied to the cathode for 125 seconds.

A cadmium-tin oxide layer with a thickness of about 500 angstroms is deposited from a cadmium-tin target with an atomic ratio of two. Deposition takes place in an argon-oxygen atmosphere containing 10% oxygen by volume at pressure of 40 millitorrs with a voltage of −1850 V applied for 193 seconds.

Figure 6:
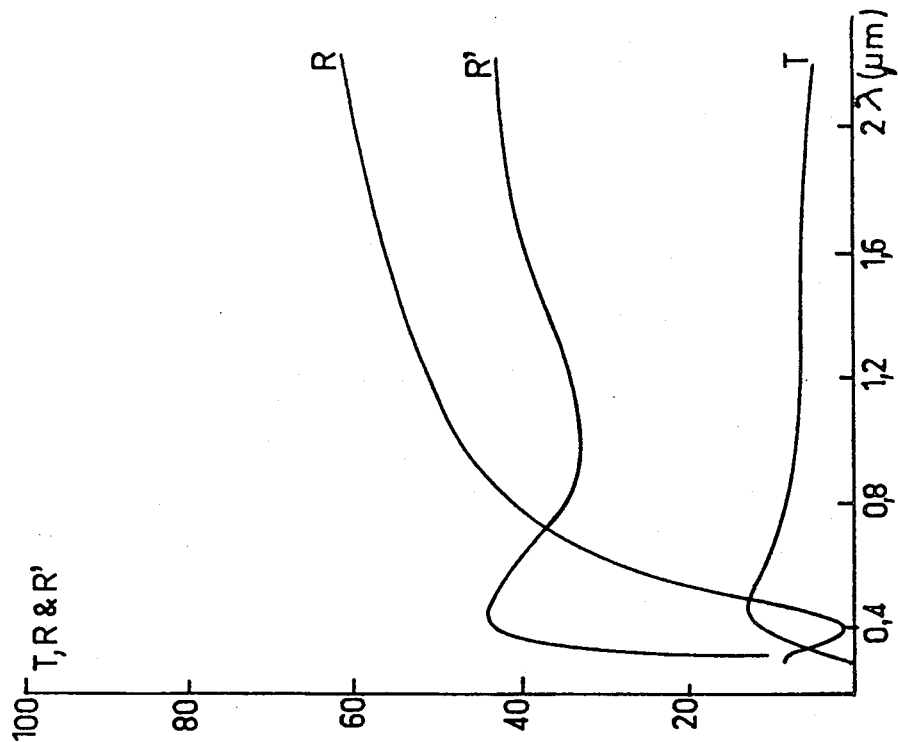

FIG. 6 illustrates the spectrophotometric characteristics of the resulting glass. This glass is particularly useful in regions which experience excessively high temperatures.

EXAMPLE 7

A 4 mm thick glass substrate is coated with a nickel-chromium layer having a weight ratio of nickel/chromium of four. This layer is deposited by thermal evaporation under a vacuum of $2.0 \times 10^{-5}$ Torr, and stopped when the resulting glazing has, for the wavelength, of 550 nm, a transmission of 70% of that exhibited by the uncoated substrate.

Next, a reflective layer of gold is deposited until the transmission is decreased to 30% of the original value.

Finally, utilizing a cadmium-tin alloy having an atomic ratio of two, a layer of mixed cadmium and tin oxide having a thickness of about 500 angstroms is deposited using a cathode sputtering device in an argon-oxygen atmosphere containing 10% oxygen by volume at a pressure of 40 millitorrs with a voltage of $-2960$ V applied for 89 seconds.

Figure 7:
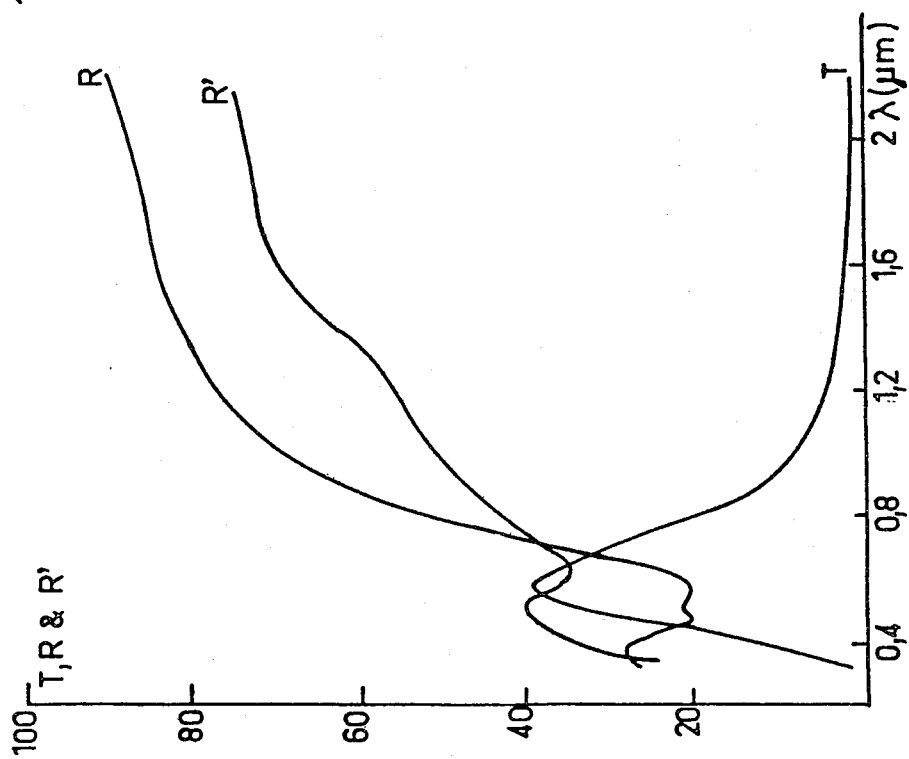

FIG. 7 illustrates the spectrophotometric characteristics of the resulting glass. This particular glass possesses a mirror-like appearance when viewed from the uncoated side and allows only a slight energy transmission in the infrared spectrum.

EXAMPLE 8

The apparatus previously described in Example 1 is employed in depositing the following layers on a 4 mm thick float glass substrate: an anchoring layer as in Example 1, and a gold layer with a thickness of about 300 angstroms, which is deposited with a voltage of $-2050$ V applied for 38 seconds.

A protective layer of mixed cadmium and tin oxide is deposited with a voltage of $-2700$ V applied for 90 seconds, achieving a thickness of about 500 angstroms.

Figure 8:
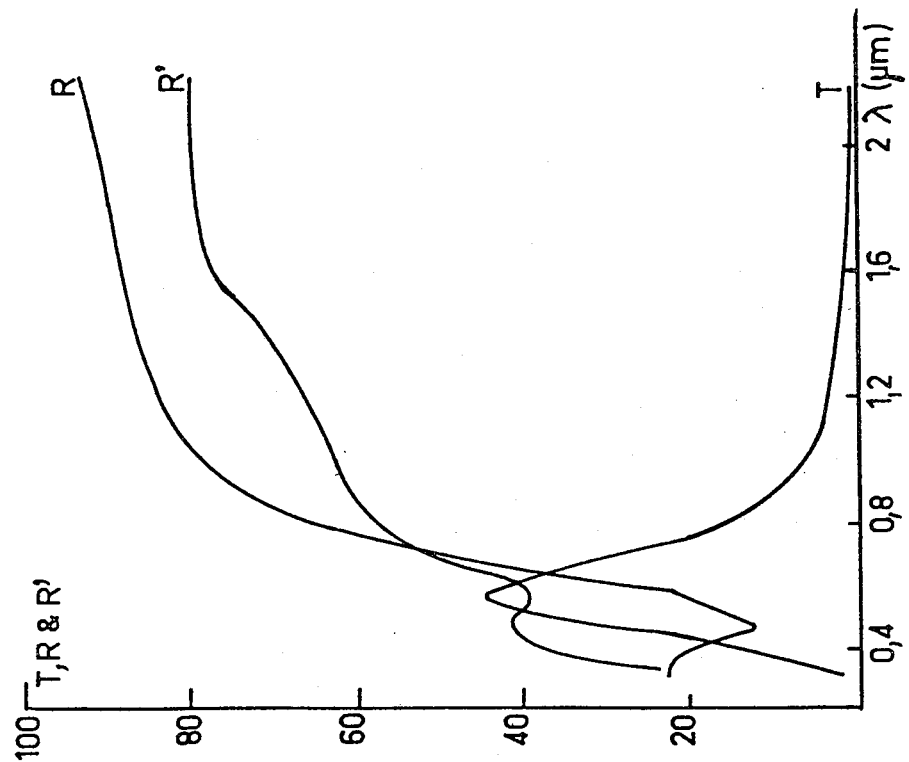

FIG. 8 illustrates the spectrophotometric characteristics of the resulting glass. Despite the difference in construction from the glass of Example 7, both glasses have similar areas of application.

EXAMPLE 9

The process previously described in Example 7 is utilized under conditions such that the percentages of transmission after the deposition of the nickel-chromium and gold layers are 80% and 47%, respectively.

A protective layer of a mixed cadmium-tin oxide is deposited using a cadmium-tin alloy target having an atomic ratio of two at a pressure of 40 millitorrs with a voltage of $-3080$ V applied for 75 seconds.

FIG. 9 illustrates the spectrophotometric characteristics of the resulting glass. This glass, which has a blue tint, exhibits a satisfactory compromise between transparency and protection from excessive heat.

EXAMPLE 10

The process previously described in Example 1 is followed except for the following changes: the anchoring layer is deposited with a voltage of $-900$ V applied for 30 seconds; the reflective layer is deposited with a voltage of $-2020$ V applied for 28 seconds; and the protective layer is deposited with a voltage of $-2650$ V applied for 83 seconds.

FIG. 10 illustrates the optical characteristics of the resulting glass. Despite the difference in construction from the glass of Example 9, both glasses have similar areas of application.

I claim:

1. Glass having selective transmission and reflection spectra comprising a transparent substrate on which a reflective layer consisting of a metal or alloy is deposited in which the reflective layer is coated with a protective layer of mixed cadmium and tin oxide.

2. Glass according to claim 1 wherein the atomic ratio of the cadmium/tin in the cadmium-tin oxide is from about 0.2 to about 10.

3. Glass according to claim 1 wherein the atomic ratio of the cadmium/tin in the cadmium-tin oxide is from about 1 to about 3.

4. Glass according to claim 1 wherein the layer of mixed cadmium-tin oxide has a thickness from about 100 to about 600 angstroms.

5. Glass according to claim 1 wherein the reflective layer has a thickness from about 50 to about 300 angstroms.

6. Glass according to claim 1 wherein the reflective layer is deposited directly onto the surface of the glass substrate.

7. Glass according to claim 1 wherein the reflective layer is deposited onto an anchoring layer previously deposited on the surface of the glass substrate.

8. Glass according to claim 7 wherein the anchoring layer consists of a mixed cadmium and tin oxide.

9. Glass according to claim 8 wherein the mixed cadmium-tin oxide has the same composition as the protective layer.

10. Glass according to claim 7 wherein the anchoring layer has a thickness from about ten to about several hundred angstroms.

* * * * *